United States Patent [19]

Richmond et al.

[11] 4,035,469
[45] July 12, 1977

[54] PRETREATMENT OF BRINE FOR BORON REMOVAL

[75] Inventors: Alvin Richmond; John Francis Bent, both of Baltimore, Md.

[73] Assignee: Martin Marietta Corporation, Bethesda, Md.

[21] Appl. No.: 638,143

[22] Filed: Dec. 5, 1975

[51] Int. Cl.² .................... C01F 5/08; C01F 5/30
[52] U.S. Cl. ............................ 423/164; 210/45; 210/47; 423/276; 423/497; 423/636
[58] Field of Search .......... 423/164, 636, 298, 497, 423/498, 198, 276; 210/47, 45

[56] References Cited

U.S. PATENT DOCUMENTS

| | | | |
|---|---|---|---|
| 2,398,743 | 4/1946 | Heath et al. | 423/164 |
| 2,402,959 | 7/1946 | Gustafson et al. | 423/497 |
| 2,405,055 | 7/1946 | Robinson et al. | 423/164 |
| 3,393,976 | 7/1968 | Housh | 423/164 |
| 3,425,804 | 2/1969 | Rastrelli | 423/164 |
| 3,447,899 | 6/1969 | Maskal et al. | 423/432 |
| 3,482,938 | 12/1969 | Gaska et al. | 423/164 |
| 3,689,218 | 9/1972 | Hodges | 423/636 |
| 3,787,558 | 1/1974 | Briggs et al. | 423/164 |
| 3,980,536 | 9/1976 | Braithwaite et al. | 423/497 |

FOREIGN PATENT DOCUMENTS

| | | | |
|---|---|---|---|
| 2,060,089 | 6/1972 | Germany | 423/636 |

Primary Examiner—O. R. Vertiz
Assistant Examiner—Wayne A. Langel
Attorney, Agent, or Firm—John A. Crowley, Jr.; George W. Moxon, II

[57] ABSTRACT

A process for removing boron contaminant from magnesium halide-containing brine wherein the brine is contacted with active magnesia to precipitate boron-containing magnesium hydrate and to remove at least 50%, and up to at least 95%, by weight of the total boron content of the untreated brine, without reduction of the magnesium halide content of said brine. The active magnesia is employed in an amount of from about 0.1% to about 10% by weight, preferably from about 2% to about 6% by weight, of the untreated brine, which may be heated e.g., from about 140° F to the boiling point thereof, prior to contact with said active magnesia. Subsequently, the treated brine can be used, by reacting it with dolime, to form magnesium hydroxide which, in turn, can be calcined to produce MgO, each of which is a high-purity-low-boron product, i.e., less than 150 ppm boron on an oxide basis, and preferably less than 75 ppm. In addition, the MgO will contain less than 1.5% CaO and can contain, under proper processing conditions, less than 0.8% CaO impurity.

16 Claims, 1 Drawing Figure

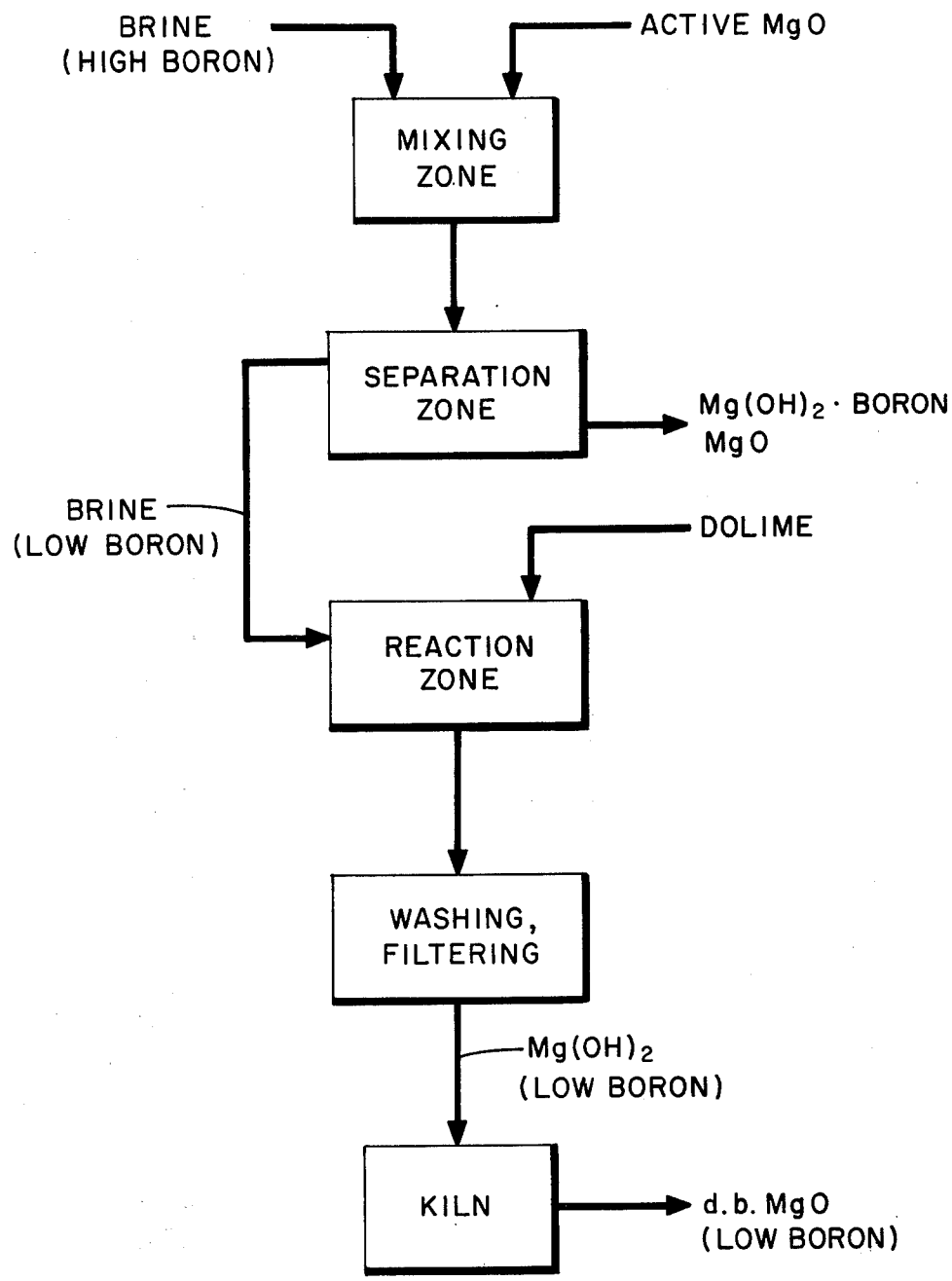

PRETREATMENT OF BRINE FOR BORON REMOVAL

BACKGROUND OF THE INVENTION

This invention relates broadly to the removal of boron from brines, and more particularly to an improved process for removing boron from magnesium halide-containing brines.

In the preparation of magnesia, MgO, it is well known to calcine the mineral magnesite, $MgCO_3$, a basic magnesium carbonate, or the naturally occurring mineral brucite, $Mg(OH)_2$, at temperatures above about 2700° F, particularly at from about 3000° F to about 4000° F. Alternately, magnesia can be prepared by calcining magnesium hydroxide, $MG(OH)_2$, obtained from magnesium halide-containing brines, such as sea water, by reacting them with dolime. The reaction produces a solid magnesium hydroxide, which, after being washed to remove chlorides and filtered to remove the liquid by-product, is passed through a kiln at calcining temperatures for conversion to MgO.

The characteristics of the magnesia products thus obtained can be varied by modification of the processing parameters, such as the kiln temperature, in accordance with the desired end use of the magnesia. A commonly desired magnesia product is periclase, a dead burned, well-crystallized material used in the manufacture of refractory brick. It has been found, however, that the impurity boron, probably present in the form of borates, causes processing difficulties in the production of certain forms of refractory brick and remains as an undesired impurity in the finished product. As a result, it is highly desirable in the art to have a relatively low boron-containing MgO product, i.e., one having a boron content of less than 150 parts per million (ppm) boron on an oxide basis. For this purpose, magnesium hydroxide product obtained from magnesium halide-containing brines must be one having such a low boron content, i.e., below 150 ppm (parts per million) and preferbly below 75 ppm. The boron content of the magnesium hydroxide can be controlled to such low levels either by careful control of the brine-dolime reaction or by removing or significantly reducing the boron level in the magnesium halide-containing brine prior to reaction with dolime.

While the boron content of brines will, of course, vary considerably from one source to another, a typical brine employed in refractory production operations in Michigan, containing about 95-115 gpl (gram per liter) $MgCl_2$, has a boron content of approximately 50 mg/l (milligrams per liter), i.e., 40 ppm at a specific gravity of about 1.24 – 1.26. If such a brine is employed in excess of the stoichiometric requirements of the brine-dolime reaction, most of the boron from the brine will be found, by analysis, in the $Mg(OH)_2$ product. When using a brine/dolime weight ratio of 12/1 with the above-mentioned brine, the amount of boron found in the $Mg(OH)_2$ product is 480 ppm, which is equivalent to about 700 ppm boron on an oxide basis.

In order to obtain a relatively low boron-containing MgO, i.e., less than 150 ppm, it is necessary to regulate the processing conditions during the reaction of brine and dolime to operate on the highly alkaline side to obtain $Mg(OH)_2$ containing less than 150 ppm boron on an oxide basis. In a continuous system, an upset in the process can cause the production of off-specification $Mg(OH)_2$ having more than 150 ppm boron, with the off-spec material becoming a part of the overall system, rendering all of the $Mg(OH)_2$ in the system out of specification. One of the major ways of overcoming such off-spec $Mg(OH)_2$ is by dilution. A considerable amount of time and $Mg(OH)_2$ be be lost, in such circumstances, due to an upset in the system when producing a low boron product.

A method of assuring a low boron product without such processing difficulties would be to remove the boron from the brine before reacting said brine with dolime. A number of techniques for pre-treatment of magnesium halide-containing brines for this purpose have been proposed. In such techniques, particularly where CaO or dolime are employed in the pre-treatment of brine, the $MgCl_2$ content of the brine is reduced. Such reduction of brine strength is undesired with respect to the subsequent use of the brine, as by reaction thereof with dolime. Still further, the methods for producing magnesium hydroxide containing less than 150 ppm (oxide basis) boron frequently results in a product contaminated with 1.5 – 2.0% CaO (MgO basis) which is introduced in the refining process and which is a commercially unacceptable product since not more than 1.0% CaO is preferred, although up to 1.5% CaO is acceptable.

In the production of magnesia and related activities, there is, as a result, a continuous desire for improvement in the techniques available for production of low boron products from magnesium halide-containing brines, especially those products which are low, i.e., less than 1.5 percent, in CaO as well. In particular, there is a need for new techniques for pre-treating brines to remove boron therefrom prior to the reaction to the brine with dolime.

SUMMARY OF THE INVENTION

Active magnesia is used to pre-treat magnesium halide-containing brines and to achieve very appreciable reduction in the boron content of said brines. More than 50%, usually more than 75%, and generally more than 95%, of the total boron content of the brine is removed with the magnesium hydrate precipitate formed and separated from the treated brine without reduction in the strength of the brine. The treated brine can then be reacted with dolime to form magnesium hydroxide under a wide range of processing conditions having a boron content of less than 150 ppm. With modest restrictions in process conditions, a level of 75 ppm boron, based upon MgO, or less is easily obtainable, and levels of 35 ppm boron (oxide basis) have been achieved. The low boron magnesium hydroxide can be employed to produce dead burned magnesia, such as periclase, having a boron content of less than 150 ppm and being suitable for use in finished refractory products in which a low boron content is required. Therefore, it is an object of the invention to provide an improved process for the removal of boron from magnesium halide-containing brines.

It is a further object of the invention to provide a process for the treatment of brines to reduce the boron content thereof without reduction of the strength of the brine being treated.

It is another object to provide a process for the production of high-purity low-boron magnesium hydroxide, containing less than 1.5% CaO (MgO basis) and less than 150 ppm boron from boron-containing, brines.

It is a still further object to provide an improved process for the production of dead-burned magnesia.

It is yet another object to provide an improved process for producing magnesium hydroxide and dead burned magnesia having a low-boron, low-calcium oxide content, particularly less than 75 ppm (oxide basis) boron and 1.0% CaO, from magnesium halide-containing brines having appreciable boron contamination.

These and other objects and advantages of the invention will become apparent upon reference to the following description, drawings and claims.

BRIEF DESCRIPTION OF THE DRAWING

The invention is hereinafter further described in detail with particular reference to the accompanying drawing in which the single FIGURE is a flow diagram illustrating an embodiment of the novel process of the invention.

DETAILED DESCRIPTION OF THE INVENTION

The present invention relates to the removal of boron from magnesium halide-containing brines. Such brines include sea water, well brines and the like, in which boron is present, e.g., as water soluble borates, in admixture with other salts. Although it will be appreciated that the boron content of brines may vary considerably from one source to another, the boron content may, as indicated above, be on the order of 500 ml/l, i.e., 40 ppm at a specific gravity of 1.250. If such a brine were reacted, without prior treatment, in suitable proportions with dolime, the $Mg(OH)_2$ produced would have a boron level of 200-300 ppm and any MgO product produced from such a magnesium hydroxide material would likewise have an undesirably high, although not uncommon, boron, content, rendering it unacceptable for use in particular refractory bricks where a low boron content is required.

In accordance with the present invention, the boron content of the magnesium halide-containing brine is reduced by contacting it with active magnesia prior to the use of said brine for reaction with dolime. As is well known in the art, active magnesia, also known as caustic magnesia, is an MgO product formed by light or soft burn calcination of a magnesia starting material at temperatures of less than 2700° F, generally on the order of about 1800°-2200° F. The active magnesia formed is not completely shrunken, but exists in a cryptocrystalline or microamorphous, state. Commonly employed starting materials in the preparation of active magnesia are natural occurring magnesite, $MgCO_3$, or brucite, $Mg(OH)_2$, magnesium hydroxide produced from sea water, magnesium sulfate, magnesium chloride and similar magnesium compounds. The active magnesia produced therefrom is employed in finely-divided form to provide suitable surface area for contact with the brine to be treated. While the particle size of the active magnesia is not a critical feature of the invention, the material will desirably have a particle size of on the order of (−) 20 mesh (+) 325 mesh, U.S. screen.

In the practice of the invention, the amount of active magnesia mixed with the brine during the pre-treatment thereof will generally be from about 0.1% to about 10% by weight on the weight of untreated brine, with from about 2% to about 6%, being generally preferred. The active magnesia becomes hydrated upon contact, with the brine to form magnesium hydrate precipitate. The stripping of boron from the brine appears to be associated with the hydration of the active magnesia, the resulting magnesium hydrate precipitate having boron contained therein. The boron-containing magnesium hydrate precipitate, together with any remaining magnesia, are separated from the treated brine in any suitable separation operation, as by passage to a thickener, where the boron-containing solids are settled and removed as thickened underflow.

By thus treating the boron contaminated magnesium halide-containing brine, the boron content thereof can be effectively and appreciably reduced with a minimum of processing to produce a treated brine suitable for use in the production of magnesium hydroxide, magnesia and other products having a boron content of less than 150 ppm. Additionally, a high-purity MgO can ultimately be obtained because the pre-treatment of brine in the prescribed manner results in a $Mg(OH)_2$ product containing less $Ca(OH)_2$ as an impurity than that obtained when using untreated brine. The magnesium hydrate separated from the brine will conveniently have a boron content of at least about 50% by weight of the total boron content of the untreated brine. The exact amount of boron removed depends, of course, on the amount of active magnesia mixed with the brine in the pre-treatment operation, the contact time and the temperature, the latter two variables being principally dependent upon the quantity of brine to be treated. By operating with the preferred amounts of active magnesia, advantageously about 5% by weight based on the weight of untreated brine, the boron content of the magnesium hydrate precipitate can be at least about 95% of the total boron content of the untreated brine. This highly desirable result is obtained, furthermore, without reduction in the strength of the brine, i.e., the magnesium halide content thereof.

The embodiment of the invention shown in the drawing provides for heating the untreated brine to contact with active magnesia in a mixing zone for sufficient time to enable hydration of the active magnesia to form a boron-containing magnesium hydrate precipitate. The boron removed is associated with the hydration of the active magnesia by either coprecipitation or adsorption, or a combination thereof. The magnesium hydrate slurry is passed to a separating or thickening zone from which the thickened-boron containing magnesium hydrate precipitate, together with unreacted magnesia is withdrawn. This relatively low quality material has been found to be sinterable, with the boron content thereof serving as a sintering aid.

The untreated brine overflow of reduced boron content from the separating zone is passed to a reaction zone for reaction with dolime as follows:

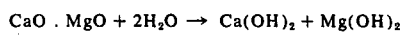

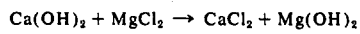

Magnesium hydroxide of low boron content is formed as a recoverable solid product that, after being washed to remove chlorides and filtered to remove liquids, can be converted to MgO by calcining at appropriate temperatures in a kiln. The particular low boron MgO product thus produced will vary in accordance with the various processing parameters employed, as is well known in the art, with periclase a common calcining product.

It has been found that the process of the invention is enhanced by contacting the active magnesia and boron-containing brine at an elevated temperature. While temperatures of from generally around 32° F. up to the boiling point of the contacted mixture can be employed, it is desirable to carry out the pre-treatment at elevated temperatures, desirably at from about 150° F. to said boiling point, preferably at from about 180° F. to about 200° F. For this purpose, the untreated brine can be heated to the desired temperature prior to contact with active magnesia.

In various illustrative examples of the invention, 95% removal of boron was achieved, while the treated brine had a $MgCl_2$ strength equal or greater than that of the untreated brine, and the increase in magnesium halide strength was due to concentration by evaporation of water at the process of temperatures employed and to hydration of the active magnesia. In one example, 200 g of brine having 52 mg/l of boron was contacted with 20 g of active MgO at a temperature of 150° F. for two hours. The boron-containing magnesium hydrate precipitate was separated from the treated brine, which had a boron content of 8 mg/l Thus, over 85% of the boron in the untreated brine was removed therefrom. In a similar example, 400 g of brine containing 52 mg/l of boron was contacted with 20 g of active MgO for two hours under reflux conditions to produce a treated brine having a boron content of 7 mg/l.

In an additional test, 400 g of brine having a boron content of 52 mg/l was contacted with 20 g of a partially hydrated MgO under reflux conditions for 1 hour, with the treated brine having a boron content of 27 mg/l. In yet another test, 400 g of brine having a boron content of 52 mg/l was contacted with partially hydrated MgO which was more hydrated than in the previous test under reflux conditions for two hours, with the result that the boron content of the brine was reduced to 40 mg/l Again, in a test employing 400 g of said brine having 52 mg/l boron, contact with 20 g of active MgO under reflux conditions for 10 minutes, followed by separation of the boron-containing magnesium hydrate, resulted in the production of a treated brine having a boron content of 5 mg/l. In similar tests using 400 g of the same brine and 5 g of active MgO, a treated brine having a boron content of in the range of 25-30 mg/l was obtained with the pre-treatment taking place at reflux for periods of time of from 10 minutes to two hours.

In order to further demonstrate the invention, a number of continuous runs were made in the laboratory using brines treated in accordance with the teachings of the present invention so that the brine which had an average analyses of 110 ± 2 gpl $MgCl_2$ and 44 mg/l boron before treatment, had analyses of 110 ± 2 gpl $MgCl_2$ and 2 mg/l boron after treatment. The dolime and brine were continuously fed to a primary reactor at rates ranging from 10.0 – 10.8 g/min. and 117 – 123 g/min. respectively. The primary reactor overflowed to a secondary reactor where an additional 3-8 g/min. of treated brine was added. The duration of the runs ranged up to six hours and the process conditions, although varied, were such as are conventional in the art. By varying the brine/dolime ratio, the following levels of boron and calcium oxide in the produce $Mg(OH)_2$ were achieved:

| Run | Amount of CaO (% by weight, based on MgO) | Boron (ppm based on MgO) |
|---|---|---|
| No. 1 | 0.46 | 82 |
| No. 2 | 0.65 | 36 |
| No. 3 | 0.74 | 31 |
| No. 4 | 0.76 | 22 |
| No. 5 | 0.90 | 19 |

The present invention, therefore, provides a convenient and commercially significant technique for reducing the boron content of magnesium halide-containing brines contaminated with boron. The subject process has the highly desirable feature of permitting the reduction of the boron level without reduction in the strength of the brine. Since as much as 95% reduction in the boron level of the brine can be achieved, the treated brine can be used for a variety of purposes requiring a low boron level, as in the production of magnesium hydroxide and MgO with a boron level below 150 ppm. An additional benefit of using treated brine to produce $(MgOH)_2$ and MgO is the attainment of a product containing lower level $Ca(OH)_2$ and CaO. Such a product can be successfully employed in finished refractory brick materials in which the boron level must be kept within such limits.

Although the present invention has been described in conjunction with preferred embodiments, it is to be understood that modifications and variations may be resorted to without departing from the spirit and scope of the invention as those skilled in the art will readily understand.

Therefore we claim:

1. A process for producing, from boron contaminated magnesium halide-containing brine, magnesium hydroxide having a low boron and low-calcium oxide content comprising:
    a. contacting the boron contaminated, magnesium halide-containing brine with finely divided active magnesia, which has been formed by light or soft burn calcination of magnesia at a temperature of less than 2700° F and which is in an amount of from about 0.1% to about 10% by weight based upon the weight of the untreated brine, said brine being at a temperature in the range of from about 32° F to the boiling point of the mixture of the brine and the activated magnesia, to precipitate boron-containing magnesium hydrate which contains at least 75% by weight of the total boron content of the untreated brine;
    b. separating said precipitated boron-containing magnesium hydrate from the remainder of said brine, whereby the boron content of the brine is reduced while not materially reducing the magnesium halide content of the brine;
    c. recovering said low boron content brine; and
    d. reacting said recovered brine with dolime so as to form magnesium hydroxide, said magnesium hydroxide having a CaO content of less than 1.5% CaO (MgO basis) and a boron content of less than 150 ppm boron on an oxide basis.

2. The process of claim 1 wherein the boron contaminated brine contains from about 40 to 50 ppm boron, and said magnesium hydroxide formed and recovered from said recovered brine has a boron content of less than 150 ppm on an oxide basis.

UNITED STATES PATENT AND TRADEMARK OFFICE
CERTIFICATE OF CORRECTION

PATENT NO. : 4,035,469

DATED : July 12, 1977

INVENTOR(S) : Alvin Richmond, John Francis Bent

It is certified that error appears in the above-identified patent and that said Letters Patent are hereby corrected as shown below:

In Column 1, line 41, "preferbly" should be --preferably--.
In Column 2, line 5, "be be" should be --can be--.
In Column 3, line 29, "500 ml/1" should be --50 mg/l--.
In Column 3, line 65, after weight (first occurrence) insert --based--.
In Column 5, line 23, after mg/l insert --. (period)--.
In Column 5, line 38, after mg/l insert --. (period)--.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks